June 15, 1926.

C. J. E. JOHNSON 1,588,583

PROCESS OF MANUFACTURING WINDOW GLASS

Filed Sept. 21, 1925

INVENTOR.

Carl J. E. Johnson,
BY E. E. Overholt
ATTORNEY.

Patented June 15, 1926.

1,588,583

UNITED STATES PATENT OFFICE.

CARL J. E. JOHNSON, OF KANE, PENNSYLVANIA.

PROCESS OF MANUFACTURING WINDOW GLASS.

Application filed September 21, 1925. Serial No. 57,768.

My invention relates to a process of handling molten glass in the manufacture therefrom of window glass and the like.

My object is to provide a process which will tend to free the glass from dirt specks and bubbles, and which will give a finished product free from streaks and glass blisters.

Minor objects will appear in the subjoined description.

The invention consists in the novel method of cleaning the ladle of water when it has been dipped in the same after the pouring of a charge of molten glass, and preparatory to the reception of another charge from the melting furnace.

After the molten glass has been poured from the ladle into the pot from which it is blown, the ladle which is usually made of steel is dipped into water, in order to cool the ladle and shatter from its surface the molten glass still adhering thereto. This, of course, leaves the inside of the ladle wet, and frequently with particles of dirt which were in the water adhering to it. If while in this condition the ladle is used for dipping another charge of molten glass from the furnace to be conveyed to the blowing machine, blisters or bubbles of water from the inside surface of the ladle form on top of the molten glass sometimes taking the form of a cherry and rolling over the surface of the glass somewhat like quicksilver. When glass in this condition is blown, streaks will be formed from the blisters even in the very best glass; and bits of dirt that get into the ladle from the tub, will be in the glass.

My invention provides means for thoroughly drying the inner surface of the ladle, while at the same time tending to clean it from particles of dirt from the tub before it is again used for dipping the next charge of glass.

One method of applying my invention to practice is illustrated in the accompanying drawings, in which:—

Figure 1:
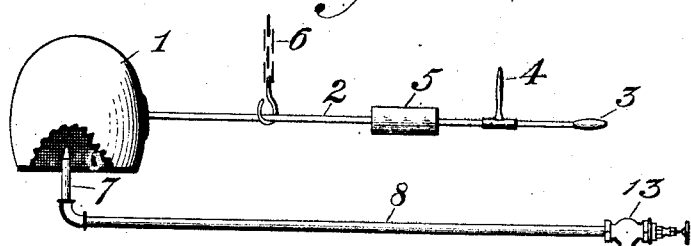
Figure 2:
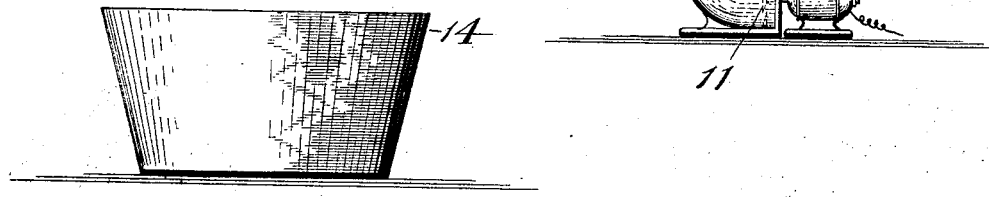

Fig. 1 is a side elevation of my arrangement, showing a dipping ladle in its inverted position over the drying and cleaning nozzle, a part of the ladle being broken away to show all of the nozzle; and Fig. 2 is a side elevation of the water tub.

Referring further to the drawings, the numeral 1 indicates an ordinary glass ladle having the stem 2 with a handle 3 at its outer end, and also the turn-handle 4 slightly inward from the handle 3. The stem 2 is also provided with the counterweight 5 which is movable longitudinally back and forth on the stem as occasion may require. The ladle may be borne up by a suitable slide or support 6 depending from a crane or other support (not shown). These parts are all of ordinary construction, and of themselves do not form any part of my invention.

I further provide an air nozzle 7 which is supplied with air through a pipe line 8, 9, leading to an air chute or reservoir 10, which is supplied with clean air by any ordinary or preferred means. In the present instance, I have shown, in dotted lines, an ordinary fan 11 located in the mouth of the chute, and driven by an electric motor 12 for forcing air into this chute or reservoir.

For convenience in controlling the blast of air passing through the pipe line, the sections 8 and 9 thereof are at their point of union provided with a valve 13.

After a charge of glass has been poured from the ladle, and the ladle has been dipped in the tub 14, the operation of cleaning the interior of the ladle of water and dirt preparatory to receiving another charge of molten glass, is as follows:—The ladle is inverted over the air-nozzle 7, as illustrated in Fig. 1 of the drawings, and by a suitable manipulation of the valve 13, a blast of air, or a succession of sudden or intermittent blasts may be turned into the ladle, thus completely drying it of water, and also tending to dislodge any particles of dirt that may be adhering to its interior surface. Thus the interior of the ladle is dried and cleaned before being again used.

Thus it will be seen that I have devised a very simple and effective process for producing clean glass with an even, smooth surface, free from all water-blisters now so commonly found in glass.

Having thus described my invention and shown one method of applying the same to practice, what I claim as new and desire to protect by Letters Patent is:—

The process of handling molten glass in a ladle employed for conveying the glass from the furnace, said process comprising the dipping of the ladle into water, and then the delivering into the interior of the ladle a blast of air for drying and cleaning said interior prior to the reception of another charge of molten glass.

In testimony whereof I affix my signature.

CARL J. E. JOHNSON.